United States Statutory Invention Registration [19]

Davis et al.

[11] Reg. Number: H652

[43] Published: Jul. 4, 1989

[54] SENSOR FOR DETECTION OF LIQUID SPILLS ON SURFACES

[75] Inventors: Brent C. Davis; Tom M. Gayle, Oak Ridge, both of Tenn.

[73] Assignee: The United States of America as represented by the United States Department of Energy, Washington, D.C.

[21] Appl. No.: 233,092

[22] Filed: Aug. 17, 1988

[51] Int. Cl.[4] ..... G08B 21/00; H01H 29/00

[52] U.S. Cl. ..... 340/622; 73/295; 200/61.04; 340/604; 340/605

[58] Field of Search ..... 340/604, 605, 622; 73/295; 200/61.04

[56] References Cited

U.S. PATENT DOCUMENTS 4,037,427 7/1977 Kramer ..... 340/622

4,413,255 11/1983 Cohen et al. ..... 340/622

*Primary Examiner*—Thomas H. Tarcza

*Assistant Examiner*—Linda J. Wallace

*Attorney, Agent, or Firm*—David E. Breeden; Stephen D. Hamel; Judson R. Hightower

[57] ABSTRACT

A surface liquid detector is disclosed for detecting liquids spilled on surfaces such as floors. A temperature-sensitive thermistor probe is used in a bridge circuit to detect the change in resistance in the thermistor due to the change in thermal conductivity that occurs when a liquid contacts the probe. The device is characterized by the ability to detect either conductive or nonconductive liquids, such as water or oil spills.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SENSOR FOR DETECTION OF LIQUID SPILLS ON SURFACES

This invention, which is a result of a contract with the United States Department of Energy, relates generally to instrumentation for the detection of liquid spills. and more specifically to devices for detecting liquid spills on floors and the like.

BACKGROUND OF THE INVENTION

In metal and ceramic creep test laboratories, for example, extensive testing of materials is carried on for long periods of time during which the test equipment is unattended. The equipment in these laboratories include a number of flexible hoses used for cooling water and hydraulic fluids which operate under pressure. Since the laboratories are often unattended, especially when operated around the clock, large quantities of these liquids may be spilled on the floors and work surfaces before being discovered.

These liquid spills have a number of consequences. With an oil spill, it becomes very important to prevent large quantities from entering the building drain system due to prohibitions on oils in waste water and the subsequent fines. If a water hose fails, the loss of cooling water to a test machine can cause considerable equipment damage. In either case, cleanup after extended flooding is costly and time consuming.

A search for commercially available liquid spill detectors which could be electrically connected to a remote alarm system, revealed that the available detectors work only to detect electrically conductive liquids and thus would not work in a situation where both water and oil spills are to be detected. The available detectors function to detect an electrically conductive liquid through a change in the resistance between spaced electrode arrays which are located in an area to be contacted by these liquids. These devices are insensitive to nonconductive liquid spills, such as oil spills, and further could be made insensitive to water spills, for example, if first coated with an oil spill. Therefore, it will be appreciated that there is a need for a liquid spill detection device which is sensitive to both conductive and nonconductive liquid spills.

SUMMARY OF THE INVENTION

In view of the above need, it is an object of this invention to provide a liquid spill detector that is sensitive to the detection of both conductive and nonconductive liquids.

Other objects and many of the attendant advantages of the invention will be apparent to those skilled in the art from the following detailed description of the preferred embodiment of the invention.

Briefly, the liquid spill detector of the present invention includes a temperature-sensitive thermistor probe assembly including a mounting means for carrying the probe so as to be disposed in contact or close proximity to a surface to be monitored. The probe is connected in a bridge circuit to detect changes in the resistance of the probe thermistor due to a change in temperature brought about by the change in thermal conductivity that occurs when a liquid contacts the probe. The bridge output is monitored by an alarm circuit which is activated upon the detection of the associated change in resistance of the probe thermistor to indicate that a liquid spill has been detected. The detector is sensitive to both conductive and nonconductive liquids.

DETAILED DESCRIPTION

Figure 1:
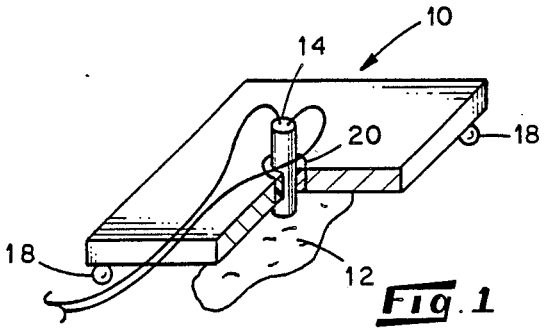
FIG. 1 is a pictorial view, partially cut away, illustrating the thermistor probe assembly of a liquid spill detector according to the present invention.

Referring now to FIG. 1, there is shown the thermistor probe assembly 10 arranged for the detection of films or streams of a spilled liquid 12 on a surface such a floor. A probe 14 consisting of a temperature-sensitive thermistor encased in a glass envelope is mounted to protrude through the bottom of a mounting plate 16 having feet 18 to raise the mounting plate 16 approximately 3/16 inch off the floor thus permitting the free flow of a liquid to be detected underneath the mounting plate.

The thermistor probe 14 is positioned in a center opening 20 of the plate 16 such that the sensing thermistor is in contact with or in close proximity to the surface beneath the assembly being monitored so that the probe tip will contact the spilled liquid 12. The probe may be held in place in the opening 20 by epoxy bonding (as shown) or through an appropriate adjustable mounting assembly. The thermistor probe 14 is preferably a glass enclosed temperature-sensitive resistor, such as the model GB31P2 supplied by Fenwell Electronics, Framingham, Mass. The probe is connected to the detector circuitry via a small two conductor cable 22 of suitable length (up to about 100 feet).

The thermistor is used in the self-heating mode by passing an electrical current through the thermistor sufficient to raise the probe temperature to a value of approximately 60 degrees above ambient temperature when the probe is exposed to air. When any liquid contacts the probe, its temperature drops and its resistance increases appreciably due to the greater thermal conductivity and specific heat of the contacting liquid.

Figure 2:
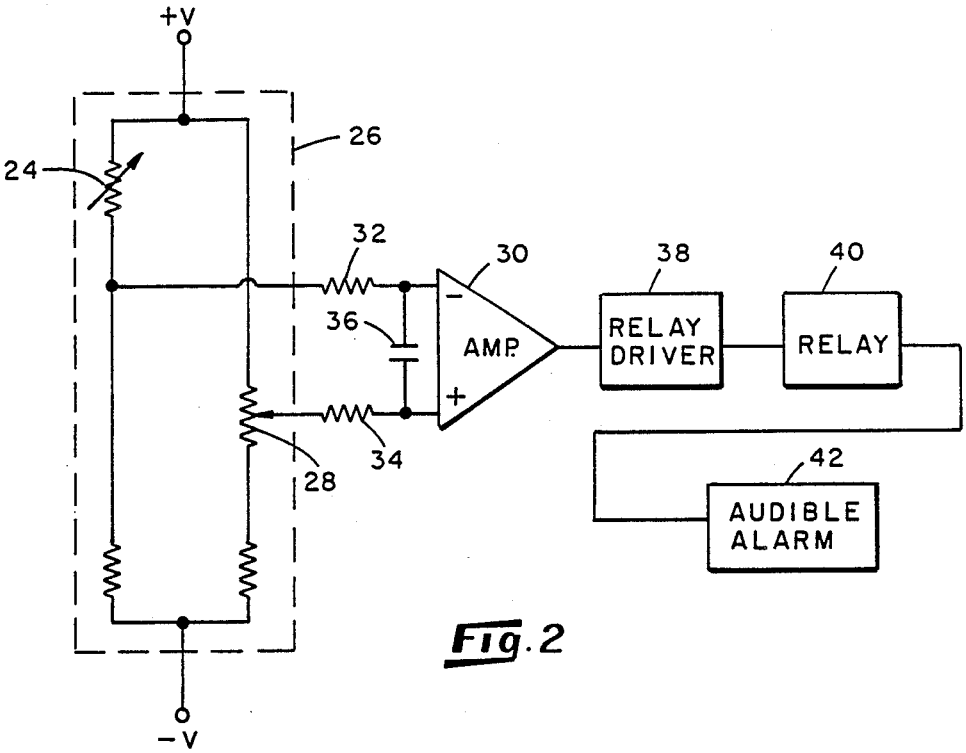
FIG. 2 is a schematic wiring diagram of a liquid spill detector according to the present invention.

This change in resistance is sensed by connecting the thermistor of the probe 14, illustrated as a variable resistance element 24 in FIG. 2. to form one leg of a bridge circuit 26 having input terminals connected between the + and − outputs of a DC power source V. The opposite leg of the bridge includes a potentiometer 28 connected with the adjustable arm electrode as one output terminal of the bridge 26. The output of the bridge 26 is connected to the inputs of an operational amplifier 30 through an appropriate filter circuit formed by resistors 32 and 34 and a capacitor 36, such that the adjustable arm of potentiometer 28 is connected to the + (non-inverting) input. The output of the amplifier is connected to the input of a relay driver 38 which in turn drives a relay 40. The relay 40 may take the form of a lock-in relay which must be reset following an alarm condition and may be connected to various types of alarm annunciation devices, such as an audible alarm device 42 as illustrated in FIG. 2.

In operation, the probe assembly 10 is located on a surface to be monitored for liquid spills and the set point potentiometer is adjusted so that there is no activation of the alarm when liquid is not present. When liquid contacts the probe 14, the thermistor (element 24 in FIG. 2) resistance increases due to the associated drop in probe temperature. This increase in resistance causes the signal applied to the inverting (−) input of amplifier 30 to decrease relative to the non-inverting input which is operated at a selected set point voltage by the adjustment of the potentiometer 28. When the signal applied to the inverting input exceeds the voltage applied to the non-inverting (+) input, the output switches states activating the relay driver 38 which in turn activates the alarm 42 through the activation of relay 40.

Testing of the device indicated that a single drop of oil could be detected by moving the probe into contact with a drop of oil placed on a surface, without producing false alarms. The device is insensitive to changes in room temperature of at least plus or minus 30 degrees.

Thus it will be seen that a very versatile and simple liquid spill detector has been provided which responds to both aqueous and hydrocarbon liquids. It is expected that future production models may be constructed to operate a number of probe units from common power supplies, and also provide a latch-in network in the output alarm with manual reset to clear the alarm.

We claim:

1. A liquid spill detector for detecting the presence of a liquid on a monitored surface, comprising:

a probe mounting assembly including a temperature-sensitive thermistor sensing probe whose resistance changes in inverse proportion to the exposed temperature and means for mounting said probe in a position to be placed in contact with a liquid present on said monitored surface;

a detection circuit means coupled with said sensing probe for generating an alarm signal in responsive to a substantial change in the resistance of said thermistor sensing probe due to a corresponding change in temperature produced by a change in thermal conductivity when contacted by a spilled liquid; and an alarm circuit means responsive to said alarm signal generated by said detection circuit means for generating an indication of an alarm condition upon the detection of said spilled liquid.

* * * * *